US008970063B2

(12) United States Patent
Leppänen

(10) Patent No.: US 8,970,063 B2
(45) Date of Patent: Mar. 3, 2015

(54) METHOD AND ARRANGEMENT FOR BALANCING VOLTAGES OF SERIES CONNECTION OF STORAGE UNITS FOR ELECTRICAL ENERGY

(75) Inventor: Ora Veli-Matti Leppänen, Mülligen (CH)

(73) Assignee: ABB Oy, Helsinki (FI)

( * ) Notice: Subject to any disclaimer, the term of this patent is extended or adjusted under 35 U.S.C. 154(b) by 806 days.

(21) Appl. No.: 13/152,014

(22) Filed: Jun. 2, 2011

(65) Prior Publication Data

US 2011/0298282 A1    Dec. 8, 2011

(30) Foreign Application Priority Data

Jun. 4, 2010    (EP) .................................... 10164920

(51) Int. Cl.
*H02J 3/14*    (2006.01)
*H02J 7/00*    (2006.01)

(52) U.S. Cl.
CPC .................................... *H02J 7/0016* (2013.01)
USPC ................... 307/32; 307/29; 307/39; 307/18; 307/24; 363/40; 363/98; 363/132; 363/131; 320/132; 320/104; 320/116; 320/166; 327/113

(58) Field of Classification Search
CPC ........ H02J 3/14; H02J 1/14; H02M 2001/008
USPC ................. 307/5, 32, 37, 46, 29, 39, 41, 109; 320/166, 167, 124, 121, 132
See application file for complete search history.

(56) References Cited

U.S. PATENT DOCUMENTS 5,910,892 A    6/1999  Lyons et al.
7,348,688 B1 *  3/2008  Stamps et al. .................. 307/29
(Continued)

FOREIGN PATENT DOCUMENTS

CN    1607708 A    4/2005
CN    2785154 Y    5/2006
(Continued)

OTHER PUBLICATIONS

European Search Report for EP 10164920.0 dated Oct. 29, 2010.
(Continued)

*Primary Examiner* — Rexford Barnie
*Assistant Examiner* — Jagdeep Dhillon
(74) *Attorney, Agent, or Firm* — Buchanan Ingersoll & Rooney PC

(57) ABSTRACT

An arrangement which includes two or more energy storage units for electrical energy connected in series, and two or more balancing resistor units. Each balancing resistor unit is connected in parallel with one of the energy storage units. The arrangement also includes means for determining a voltage over all of the series-connected energy storage units and means for determining the energy storage unit voltages between poles of the energy storage units. One or more of the balancing resistor units include a base resistor unit and a control resistor unit connected in series and a switching device connected in parallel with the control resistor units. The arrangement further comprises means for determining reference voltages for the energy storage units based on the voltage over all of the series-connected capacitors and means for controlling the switching device to control the resistance of one or more of the balancing resistor units so that the energy storage unit voltage of each energy storage unit is maintained within a set range of the reference voltage for each energy storage unit.

8 Claims, 2 Drawing Sheets

(56) References Cited

U.S. PATENT DOCUMENTS

| | | | |
|---|---|---|---|
| 8,228,044 B2 * | 7/2012 | Kotz et al. | 320/166 |
| 8,368,384 B2 * | 2/2013 | Ingman et al. | 324/105 |
| 8,466,657 B2 * | 6/2013 | Buono et al. | 320/121 |
| 2005/0212486 A1 * | 9/2005 | Nakada | 320/132 |
| 2010/0060328 A1 | 3/2010 | Ingman et al. | |

FOREIGN PATENT DOCUMENTS

| | | |
|---|---|---|
| CN | 101162847 A | 4/2008 |
| CN | 201117742 Y | 9/2008 |
| CN | 101673999 A | 3/2010 |
| EP | 0 911 950 A2 | 4/1999 |
| EP | 2 164 099 A2 | 3/2010 |

OTHER PUBLICATIONS

Chinese Office Action dated Apr. 28, 2013; statement of relevance; search report issued in corresponding counterpart Chinese Patent Application No. 201110154219.3 citing documents of technical background "A" (5 pgs.).

* cited by examiner

METHOD AND ARRANGEMENT FOR BALANCING VOLTAGES OF SERIES CONNECTION OF STORAGE UNITS FOR ELECTRICAL ENERGY

RELATED APPLICATION

This application claims priority under 35 U.S.C. §119 to European Patent Application No. 10164920.0 filed in Europe on Jun. 4, 2010, the entire content of which is hereby incorporated by reference in its entirety.

FIELD

The present disclosure relates to voltage control, such as a method and an arrangement of controlling the voltages of series-connected capacitors, and particularly to arrangements where the capacitors are paired with resistor units connected in parallel with them.

BACKGROUND INFORMATION

A series connection of power electrolytic capacitors is often specified in order to achieve an adequate voltage rating of a capacitor assembly. A DC link of a frequency converter can include such an assembly. By their nature, electrolytic capacitors exhibit leakage current. The leakage currents of the series-connected capacitors are most likely not equal. This creates differential leakage currents which make the voltage sharing of the capacitors non-ideal. Therefore, so-called balancing resistors can be used in parallel with the capacitors. The resistors can be adjusted to produce currents much larger than the differential currents so that the resistors dominate the voltage sharing.

However, this approach has some drawbacks. First, the resistance value must be low enough in order to ensure that the resistor current is the dominant one in the voltage sharing. This leads to considerable power dissipation, thus reducing the efficiency of the equipment. Second, the resistances in series must match each other with high accuracy. The deviations of the resistances will otherwise off-balance the voltage sharing.

SUMMARY

An exemplary embodiment is directed to an arrangement for balancing voltages of a series connection of energy storage units for electrical energy, such as capacitors and rechargeable batteries, which include at least two energy storage units connected in series, at least two balancing resistor units, each balancing resistor unit connected in parallel with one of the energy storage units, means for determining a voltage ($U_{tot}$) over all of the series-connected energy storage, units and means for determining energy storage unit voltages ($U_{cap}$) between poles of the energy storage units, wherein one or more of the balancing resistor units includes a base resistor unit and a control resistor unit connected in series, and a switching device connected in parallel with the control resistor unit, wherein that the arrangement comprises means for determining reference voltages ($U_{ref}$) for the energy storage units based on the voltage ($U_{tot}$) over all of the series-connected energy storage units; and means for controlling the switching device to control the resistance of the at least two balancing resistor units so that the energy storage unit voltage ($U_{cap}$) of each energy storage unit is maintained within a set range of the reference voltage ($U_{ref}$) of each energy storage unit.

Another exemplary embodiment is directed to a frequency converter, which comprises at least two energy storage units connected in series, at least two balancing resistor units, wherein each balancing resistor unit is connected in parallel with one of the energy storage units; means for determining a voltage ($U_{tot}$) over all of the series-connected energy storage units; and means for determining energy storage unit voltages ($U_{cap}$) between the poles of the energy storage units, wherein the at least two balancing resistor units comprise a series connection of a base resistor unit and an control resistor unit; and a switching device connected in parallel with the control resistor unit, wherein the frequency converter comprises means for determining reference voltages ($U_{ref}$) for the energy storage units based on the voltage ($U_{tot}$) over all of the series-connected energy storage units; and means for controlling the switching devices to control the resistance(s) of one or more of the balancing resistor units so that the energy storage unit voltage ($U_{cap}$) of each energy storage unit is maintained within a set range of the reference voltage ($U_{ref}$) for each energy storage unit.

Another exemplary embodiment is directed to a method of controlling the voltages of two or more energy storage units in an arrangement, which comprises at least two energy storage units connected in series; and at least two balancing resistor units, wherein each balancing resistor unit is connected in parallel with one of the energy storage units; means for determining a voltage ($U_{tot}$) over all of the series-connected energy storage units; and means for determining the energy storage unit voltages ($U_{cap}$) between the poles of the energy storage units, wherein the method comprises determining reference voltages ($U_{ref}$) for the capacitors based on the voltage ($U_{tot}$) over all series-connected energy storage units; and controlling the energy storage unit voltage ($U_{cap}$) of each energy storage unit to stay within a set range of the reference voltage ($U_{ref}$) for said energy storage unit by controlling the resistance(s) of one or more of the at lest two balancing resistor units comprising a base resistor unit and an control resistor unit connected in series and a switching device connected in parallel with the control resistor units, wherein controlling the resistance of the at least two balancing resistor units is done by controlling the switching devices.

BRIEF DESCRIPTION OF THE DRAWINGS

In the following the disclosure will be described in greater detail by means of exemplary embodiments with reference to the attached drawings, in which.

DETAILED DESCRIPTION

It is thus an object of the present disclosure to provide a method and an arrangement for implementing the method so as to overcome the above problems.

The present disclosure is based on the idea of controlling the capacitor voltages by controlling the resistance(s) of one or more adjustable balancing resistor units. An adjustable balancing resistor unit includes a base resistor unit and a control resistor unit connected in series and a switching device connected in parallel with the control resistor unit. The resistances of adjustable balancing resistor units are controlled by controlling the switching devices.

The exemplary embodiments of the disclosure provides a very simple and cost-effective way to balance the voltages of series-connected capacitors.

Figure 1:
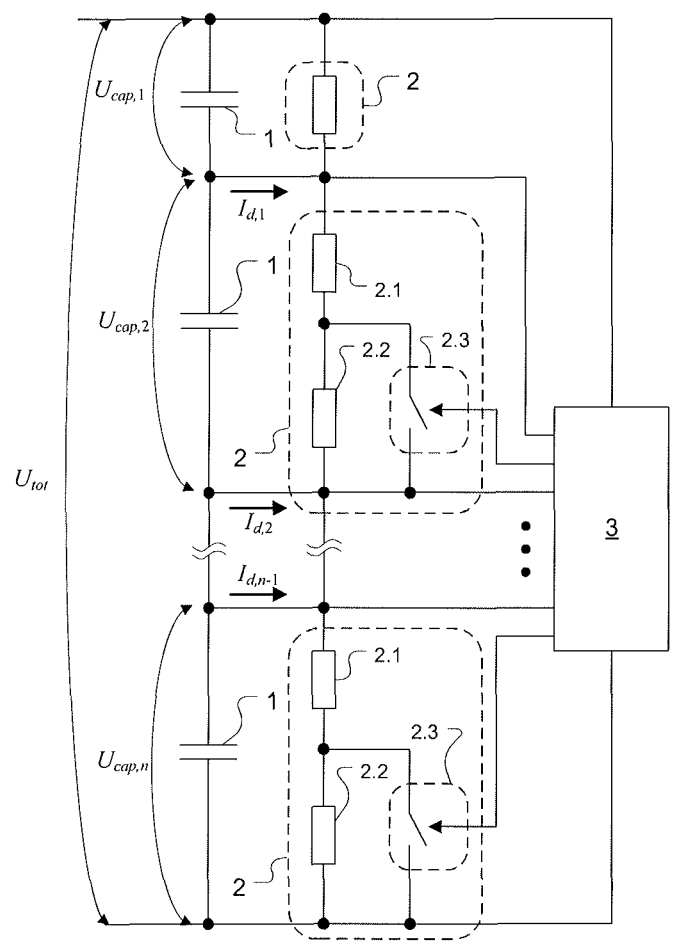
FIG. 1 illustrates a simplified block diagram of an arrangement in accordance with an exemplary embodiment.

FIG. 1 illustrates a simplified block diagram of an arrangement in accordance with an exemplary embodiment. The arrangement comprises two or more energy storage units 1 for electrical energy connected in series. An energy storage unit can be one or more capacitors connected in series and/or parallel. The energy storage unit can also be a rechargeable battery, including for example several battery cells connected in series. As shown in FIG. 1, capacitors are used as energy storage units. The differences in the parameters of the energy storage units 1 can cause differential leakage currents $I_d$ to emerge. The differential leakage currents $I_d$ in turn make voltage sharing of the energy storage units 1 non-ideal. The arrangement therefore includes two or more balancing resistor units 2, each balancing resistor unit 2 connected in parallel with one of the energy storage units 1. A resistor unit is essentially resistive and may include several resistors in parallel and/or in series. One or more of the balancing resistor units 2 are adjustable and includes a base resistor unit 2.1 with resistance $R_{base}$ and a control resistor unit 2.2 with resistance $R_{ctrl}$ connected in series and a switching device 2.3 connected in parallel with the control resistor unit 2.2. One of the balancing resistor units 2 can be non-adjustable. The voltage of the energy storage unit connected in parallel to the non-adjustable balancing resistor unit changes in response to changes in voltages of the other energy storage units connected in series. In other words, the voltage over the energy storage unit parallel to a non-adjustable resistor unit can be controlled by controlling the other energy storage unit voltages.

The arrangement further includes means 3 for determining the voltage $U_{tot}$ over all of the series-connected energy storage units, means 3 for determining energy storage unit voltages $U_{cap}$ between poles of the energy storage units 1 and means 3 for determining reference voltages $U_{ref}$ for the energy storage units 1 on the basis of the voltage $U_{tot}$ over all series-connected energy storage units 1. The voltage $U_{tot}$ over all of the series-connected energy storage units is nearly always measured for other purposes. The energy storage unit voltages $U_{cap}$ between the poles of the energy storage units 1 are also often measured for other purposes. Therefore, in most cases the measurements can be made without additional cost or additional need for space.

The arrangement also includes means 3 for controlling the switching device(s) 2.3 to control the resistance(s) of one or more of the balancing resistor unit(s) so that the energy storage unit voltage $U_{cap}$ of each energy storage unit 1 can be maintained within a set range of the reference voltage $U_{ref}$ of each energy storage unit 1.

The resistance of an adjustable balancing resistor unit can be adjusted by modulating the switching device 2.3 on and off. When the switching device 2.3 is off, the resistance is $R_{base}+R_{ctrl}$ and when the switching device 2.3 is on, the resistance is $R_{base}$. An effective resistance $R_{bal}$ of an adjustable balancing resistor unit can be determined by a duty ratio d of the switch as follows:

$$R_{bal}=R_{base}+d \cdot R_{ctrl} \quad (1)$$

where the duty ratio d is defined as follows:

$$d = \frac{t_{off}}{t_{on}+t_{off}} \quad (2)$$

where $t_{on}$ is the time of the switch being closed (conductive) and $t_{off}$ is the time of the switch being open (non-conductive). The effective resistance $R_{bal}$ can thus have values:

$$R_{base} \leq R_{bal} \leq R_{base}+R_{ctrl}. \quad (3)$$

The base resistor unit resistance $R_{base}$ and the control resistor unit resistance $R_{ctrl}$ have following constraints:

$$R_{nom}>R_{base}$$

$$R_{base}+R_{ctrl}>R_{nom} \quad (4)$$

where $R_{nom}$ is the nominal resistance of a balancing resistor unit. The maximum value for the nominal resistance $R_{nom}$ depends on the specified maximum value for the differential leakage currents $I_d$. The minimum value for the nominal resistance $R_{nom}$ depends on the specified maximum power dissipation value for the balancing resistor unit.

Based on equations (3) and (4), the effective resistance $R_{bal}$ can have values ranging from smaller to larger than the nominal resistance $R_{nom}$. The range requirements depend on the specified maximum differential leakage current and the resistance tolerance of the resistors used. In other words, the effective resistance $R_{bal}$ has to be able to differ enough from the nominal resistance $R_{nom}$ in order to be able to compensate the maximum differential leakage currents and the deviations in the resistances of the resistors used.

An implementation of a control scheme based on modulating the switching device 2.3 can for instance be accomplished by using comparators, with set levels of hysteresis, adapted to compare the energy storage unit voltages $U_{cap}$ with the reference voltages $U_{ref}$ and means for controlling the switching devices 2.3 on the basis of the result of the compare operations. The comparators control turning of the switching devices 2.3 on and off so that the energy storage unit voltages $U_{cap}$ stay within a set range of the reference voltages $U_{ref}$. When an energy storage unit voltage $U_{cap}$ exceeds a set high limit, the switching device 2.3 is turned on, the resistance of the adjustable balancing resistor unit drops and the energy storage unit voltage $U_{cap}$ starts to decrease. In a similar manner, when the energy storage unit voltage $U_{cap}$ goes below a set low limit, the switching device 2.3 is turned off. In a typical application, the switching frequency can be very low due to the relatively large dominant time constants of the circuit.

Figure 2:
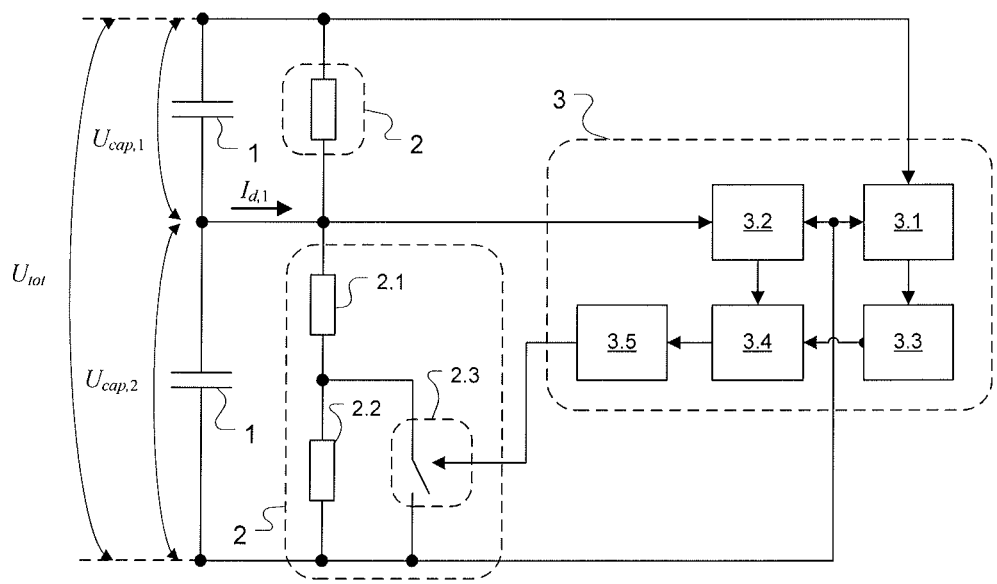
FIG. 2 illustrates a simplified block diagram of two capacitors connected in series in accordance with an exemplary embodiment.

FIG. 2 illustrates a simplified block diagram of two capacitors are connected in series as energy storage units 1 in accordance with an exemplary embodiment. Connected in parallel with each energy storage unit is a balancing resistor unit 2. The upper balancing resistor unit is non-adjustable and comprises (e.g., consists of) a single resistor unit. The lower balancing resistor unit 2 is adjustable and includes a base resistor unit 2.1 and a control resistor unit 2.2 connected in series and a switching device 2.3 connected in parallel with the control resistor units 2.2. The switching device 2.3 is controlled by a control means 3.

The control means 3 includes a measurement 3.1 of the voltage $U_{tot}$ over the series-connected energy storage units, a measurement 3.2 of an energy storage unit voltage $U_{cap,2}$ and a means 3.3 for determining reference voltages $U_{ref}$. In some embodiments an energy storage unit voltage $U_{cap,1}$ can be measured instead of the energy storage unit voltage $U_{cap,2}$.

The reference voltage $U_{ref}$ is in this embodiment set to one half of the voltage $U_{tot}$ over the series-connected energy storage units 1 so that the energy storage units can have the same voltage over both of them. The currents at the connection point between the energy storage units 1 are given as $$\frac{U_{cap,1}}{R_{bal,1}} + I_{d,1} = \frac{U_{cap,2}}{R_{bal,2}} \quad (5)$$

where $R_{bal,1}$ is the effective resistance of the non-adjustable balancing resistor unit and $R_{bal,2}$ is the effective resistance of the adjustable balancing resistor unit. The effective resistance $R_{bal,1}$ of the non-adjustable balancing resistor unit stays constant at the nominal resistance $R_{nom}$ value. It is possible to maintain the voltages $U_{cap,1}$ and $U_{cap,2}$ at the same level with each other in spite of the differential leakage current $I_{d,1}$ by controlling the effective resistance $R_{bal,2}$ of the adjustable balancing resistor unit, given that the differential leakage current $I_{d,1}$ of the energy storage units stays within specified limits.

The control means 3 also includes a comparator 3.4 with set levels of hysteresis. The comparator 3.4 can be used to compare the energy storage unit voltage $U_{cap,2}$ to the reference voltages $U_{ref}$. The control means 3 further includes means 3.5 for controlling the switching devices 2.3 on the basis of the result of the compare operation.

Next, an exemplary arrangement according to the embodiment of FIG. 2 will be used to illustrate an embodiment of the present disclosure. The voltage $U_{tot}$ over all of the series-connected energy storage units is 600 V in this example. The nominal energy storage unit voltage is therefore 300 V. The balancing resistor unit nominal resistance $R_{nom}$ is 10 kΩ. Since the upper balancing resistor unit is non-adjustable, its effective resistance $R_{bal,1}$ value is the same as the nominal resistance $R_{nom}$, 10 kΩ. In the adjustable resistor unit, the resistance $R_{base}$ of the base resistor unit 2.1 is 9 kΩ and the resistance $R_{ctrl}$ of the control resistor unit 2.2 is 2 kΩ. Therefore, the effective resistance $R_{bal,2}$ of the adjustable balancing resistor unit can have values between 9 kΩ and 11 kΩ.

Using these specifications, any differential leakage current $I_d$ between about −3 mA and +3 mA can be compensated so that the lower energy storage unit voltage stays at 300 V.

For a switching frequency estimate, capacitances of 6 mF are assumed for both energy storage units. This gives a conventional 60 second time constant for the circuit. Further, the differential leakage current $I_{d,1}$ is assumed to be zero. The rate of change of the energy storage unit voltage is thus approximately 250 mV/s. If the hysteresis level in a hysteresis switch control is chosen to be +/−1% of the nominal 300 V of the energy storage unit voltage, it will take an average of 24 seconds between each switch turn.

In this example, the voltage rating $U_{sw}$ of the switch 2.3 should be at least $$U_{sw} = \frac{U_{tot,max} \cdot R_{adj,2}}{R_{ctrl,2} + R_{base,2} + R_{bal,1}} \quad (6)$$

where $U_{tot,max}$ is the maximum expected value of $U_{tot}$; $R_{ctrl,2}$ is the resistance of the control resistor unit 2.2 of the adjustable balance resistor unit; $R_{base,2}$ is the resistance of the base resistor unit 2.1 of the adjustable balance resistor unit; and $R_{bal,1}$ is the effective resistance of the non-adjustable balancing resistor unit. This gives the switch a minimum voltage rating of less than 60 V. A 100 V switch could easily handle bus voltages up to about 900 V.

It should be evident that due to the control of the energy storage unit voltage, the dominant resistance values ($R_{bal,1}$ and $R_{base,2}$) can be increased, thus reducing their power dissipation and cost. Furthermore, their relative tolerance requirement is greatly relaxed.

Other modulation methods, for example a PWM control with a constant cycle length, can also be used. Using a switching device on its active region is also possible. Then, instead of a comparator, an embodiment of the present disclosure can comprise an operational amplifier adapted to produce control signals for controlling the energy storage unit voltages $U_{cap}$ to follow the reference voltages $U_{ref}$. The means for controlling the switching devices then operate on the basis of the control signals.

It is also feasible to use the balancing method according to the present disclosure with components other than capacitors or rechargeable batteries. Any devices in series, exhibiting a differential leakage current, can be balanced using this method.

The method and arrangement according to the present disclosure can be used in many different applications, for instance in a frequency converter.

It will be obvious to a person skilled in the art that the inventive concept can be implemented in various ways. The disclosure and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An arrangement for balancing voltages of a series connection of energy storage units for electrical energy, such as capacitors and rechargeable batteries, which include
    at least two energy storage units connected in series,
    at least two balancing resistor units, each balancing resistor unit connected in parallel with one of the energy storage units,
    means for determining a voltage ($U_{tot}$) over all of the series-connected energy storage, units and
    means for determining energy storage unit voltages ($U_{cap}$) between poles of the energy storage units, wherein one or more of the balancing resistor units includes
    a base resistor unit and a control resistor unit connected in series, and
    a switching device connected in parallel with the control resistor unit,
    wherein that the arrangement comprises:
    means for determining reference voltages ($U_{ref}$) for the energy storage units based on the voltage ($U_{tot}$) over all of the series-connected energy storage units; and
    means for controlling the switching device to control the resistance of the at least two balancing resistor units so that the energy storage unit voltage ($U_{cap}$) of each energy storage unit is maintained within a set range of the reference voltage ($U_{ref}$) of each energy storage unit.

2. The arrangement as claimed in claim 1, wherein a base resistor unit resistance ($R_{base}$) is smaller than a balancing resistor unit nominal resistance ($R_{nom}$) and the sum of the base resistor unit resistance ($R_{base}$) and a control resistor unit resistance ($R_{ctrl}$) is greater than the balancing resistor unit nominal resistance ($R_{nom}$).

3. The arrangement as claimed in claim 1, wherein the arrangement further comprises:

comparators, with set levels of hysteresis, adapted to compare the energy storage unit voltages ($U_{cap}$) with the reference voltages ($U_{ref}$); and means for controlling the switching device based on results of the compare operations.

4. The arrangement as claimed in claim 1, wherein the arrangement further comprises:

operational amplifiers adapted to produce control signals for controlling the energy storage unit voltages ($U_{cap}$) to follow the reference voltages ($U_{ref}$); and means for controlling the switching devices based on the control signals.

5. The arrangement as claimed in claim 1, wherein the energy storage unit is a rechargeable battery.

6. The arrangement as claimed in claim 1, wherein the energy storage unit includes capacitors.

7. A frequency converter, which comprises at least two energy storage units connected in series, at least two balancing resistor units, wherein each balancing resistor unit is connected in parallel with one of the energy storage units;

means for determining a voltage ($U_{tot}$) over all of the series-connected energy storage units; and means for determining energy storage unit voltages ($U_{cap}$) between the poles of the energy storage units, wherein the at least two balancing resistor units comprise:

a series connection of a base resistor unit and an control resistor unit; and a switching device connected in parallel with the control resistor unit, wherein the frequency converter comprises:

means for determining reference voltages ($U_{ref}$) for the energy storage units based on the voltage ($U_{tot}$) over all of the series-connected energy storage units; and means for controlling the switching devices to control the resistance(s) of one or more of the balancing resistor units so that the energy storage unit voltage ($U_{cap}$) of each energy storage unit is maintained within a set range of the reference voltage ($U_{ref}$) for each energy storage unit.

8. A method of controlling the voltages of two or more energy storage units in an arrangement, which comprises at least two energy storage units connected in series; and at least two balancing resistor units, wherein each balancing resistor unit is connected in parallel with one of the energy storage units;

means for determining a voltage ($U_{tot}$) over all of the series-connected energy storage units; and means for determining the energy storage unit voltages ($U_{cap}$) between the poles of the energy storage units, wherein the method comprises:

determining reference voltages ($U_{ref}$) for the capacitors based on the voltage ($U_{tot}$) over all series-connected energy storage units; and controlling the energy storage unit voltage ($U_{cap}$) of each energy storage unit to stay within a set range of the reference voltage ($U_{ref}$) for said energy storage unit by controlling the resistance(s) of one or more of the at least two balancing resistor units comprising a base resistor unit and an control resistor unit connected in series and a switching device connected in parallel with the control resistor units, wherein controlling the resistance of the at least two balancing resistor units is done by controlling the switching devices.

* * * * *